United States Patent Office 3,280,919
Patented Oct. 25, 1966

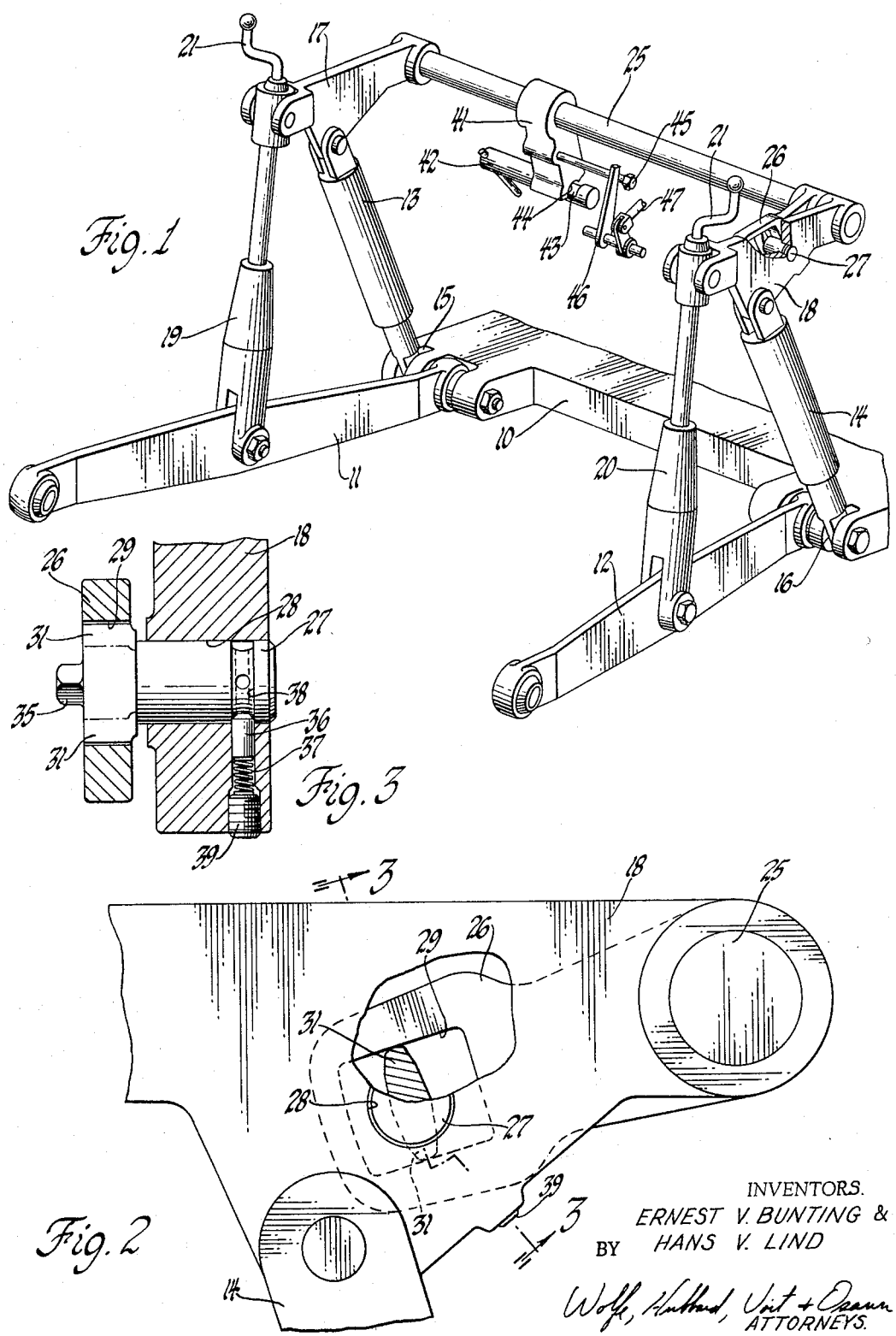

3,280,919
DUAL LIFT CYLINDER LOCK MECHANISM
FOR TRACTORS
Ernest V. Bunting, Detroit, and Hans V. Lind, Royal Oak, Mich., assignors to Massey-Ferguson Inc., Detroit, Mich., a corporation of Maryland
Filed Apr. 13, 1964, Ser. No. 359,287
4 Claims. (Cl. 172—460)

This invention relates to hydraulically operated tractor hitch linkages and concerns, more particularly dual lift cylinder linkages.

In a dual lift cylinder hitch linkage for a tractor, each one of a pair of draft links is associated with a different one of a pair of hydraulic rams or actuators. Thus, when used in the "Ferguson system" of implement force transfer and control, the implement forces are transferred to the tractor by the dual actuators acting through their respective draft links.

With the ratditional tractor-implement combination of the Ferguson system, the draft links are mechanically locked together for simultaneous up and down movement and the implement is carried on the draft links. In contrast to such fully mounted implements, semi-mounted implements have come into increasingly widespread use. Only a portion of the weight of a semi-mounted implement is transferred to the tractor and the remainder is ground supported. The ground contact allows the implement to follow ground contours independently of the tractor and, by allowing the draft links to swing independently up and down, wide implements can be effectively utilized.

A dual actuator linkage is particularly advantageous in a system intended for both pulley mounted and semi-mounted implements. The actuators are hydraulically coupled so as to equalize the loadings, are mechanically locked for fully mounted implements, and are unlocked allowing limited relative movement for semi-mounted implements. Since each of the dual actuators supports approximately one half of the total load, the lock mechanism used to convert from fully to semi-mounted operation is stressed only by any load imbalance between the actuators, rather than by one half of the total transferred load as is the case when a single actuator lifts both links. The light loading of the link interlocking mechanism is especially important when relative up and down movement of the links is permitted for handling a semi-mounted implement since the impact shocks at the limits of the permitted movement are greatly lessened.

A dual lift cylinder hitch linkage embodying a locking mechanism of the type under discussion is shown in co-pending application Serial No. 253,685, filed January 24, 1963. It is the aim of the present invention to provide an improved lock mechanism for tractors equipped with dual lift cylinders that is extremely simple in design and, hence, economical to manufacture.

It is also an object of the invention to provide a hitch linkage lock mechanism of the above type that is easy to operate and completely external of the tractor body so as to facilitate inspection, proper functioning and servicing.

Another object is to provide a linkage lock mechanism that gives good, reliable control of the hitch linkage.

Other objects and advantages of the invention will become apparent upon reading the following detailed description and upon reference to the drawings, in which:

FIGURE 1 is a fragmentary perspective of the rear of a tractor having a hitch linkage which embodies the invention;

FIG. 2 is an enlarged fragmentary side elevation of a portion of the mechanism shown in FIG. 1; and FIG. 3 is a fragmentary section taken approximately along the line 3—3 in FIG. 2.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning now to the drawing, there is fragmentarily shown the rear portion of a tractor 10 to which a pair of draft links 11 and 12 are trailingly pivoted. The links 11, 12 are hydraulically raised by a pair of hydraulically interconnected actuators 13 and 14 pivotally anchored on the tractor 10 at 15 and 16, respectively. The upper ends of the actuators 13, 14 are pivotally secured to respective ones of a pair of lift arms 17 and 18 which suspend, through respective drop links 19 and 20, the underlying draft links 11 and 12. The length of the drop links 19, 20 can be threadably adjusted by cranks 21.

The lift arms 17, 18 are pivoted on the tractor about an axis defined by a cross shaft 25. Admission of fluid under pressure to the actuators extends the actuators, pivots the lift arms 17, 18 upwardly and, hence, lifts the draft links 11, 12. Exhaustion of fluid from the actuators lowers the draft links.

In accordance with the invention, a lock arm 26 is pivoted on the axis of the cross shaft 25 adjacent the lift arm 18, is secured for rotation with the other lift arm 17, and is associated with a lock element 27 for selectively coupling the lock arm 26 and the lift arm 18. Preferably, the lift arm 17 and the lock arm 26 are non-rotatably secured to the cross shaft 25 which is rotatably mounted in the tractor 10, while the lift arm 18 is pivoted on the shaft.

The lock element 27 is fitted in alined openings 28 and 29 formed respectively in the lift arm 18 and the lock arm 26. In the illustrated construction, the opening 28 is circular and rotatably carries a circular body portion of the element 26, while the opening 29 is generally rectangular and receives a non-circular portion of the element 27 formed with oppositely extending peaks 31 defined by intermediate recesses. In one angular position of the element 27, the position illustrated in the drawing, the peaks 31 fit closely in the opening 29 so as to secure the lock arm 26 and the adjacent lift arm 18 for simultaneous pivoting. Turning the lock element 27 ninety degrees from the illustrated position frees the lock arm and the lift arm 18 for limited relative pivoting movement. Thus, with the element 27 positioned as shown so as to lock the lift arm 18 and the lock arm 26 together, the pair of lift arms 17 and 18 are mechanically connected and the hitch linkage is thus conditioned for accepting a fully mounted implement. Turning the lock element 27 ninety degrees, so as to free the lock arm 26 and the lift arm 18, permits limited relative pivoting movement between the two lift arm 17 and 18 and this in turn allows independent up and down swinging movement of the draft links 11 and 12 which is the condition required for operation with a semi-mounted implement. In either case, of course, the actuators 13, 14 exert lifting forces on the respective draft links 11, 12.

A wrench receiving head 35 is formed on the element 27 so as to project from the arm 26 and facilitate rotation of the element. The lock element 27 is held against axial and rotational movement by a detent pin 36 which is slidably fitted in a bore formed in the arm 18 and is biased by a spring 37 into a groove 38 cut into the end of the element 27. A set screw 39 anchors the spring 37 and the engagement of the pin 36 in a pair of holes spaced ninety degrees apart around the groove 38 anchors the element 27 against axial movement and accidental rotational movement.

In order to lock the draft links 11, 12 in their uppermost or transport positions, a lever 41 is secured to the center portion of the cross shaft 25. A cooperating lock pin 42 is journalled in the tractor and is formed with a cut-out 43 which permits the lever 41 to swing freely relative to the pin. However, with the links 11, 12 in their illustrated transport position, the lever 41 overlies the lock pin 42 and rotation of the pin causes the pin body to fit into a groove 44 formed in the lower portion of the lever 41 so as to lock the lever, and hence the cross shaft 25, in the illustrated angular position. This serves to mechanically lock the draft links in transport position.

The lever 41 also serves as the first element of a position feedback linkage that includes a finger 45 carried by the lever 41, a bell crank 46, and a link 47 that extends forwardly and is connected to the valve and its controls which regulate the flow of fluid to and from the actuators 13, 14.

Those familiar with the art will appreciate that the lock mechanism illustrated and described above is extremely simple in design since, essentially, it consists of only two parts: the lock arm 26 and the lock element 27. This design simplicity contributes to reliability in operation and also makes the unit economical to manufacture. Moreover, these elements are positioned adjacent one of the normally provided lift arms and, hence, they are outside of the tractor body so as to facilitate inspection, servicing, and visual control for proper operation. It can also be seen that the disclosed hitch linkage is rugged and well suited for commercial manufacture and use.

We claim as our invention:

1. In a tractor having a pair of trailing pivoted draft links, a link lifting assembly comprising, in combination, a pair of lift arms pivoted about an axis on said tractor one above each of said draft links, a pair of drop links respectively coupling said lift arms and the underlying draft links, a pair of hydraulically interconnected actuators anchored on said tractor and respectively secured to said lift arms for hydraulically raising said draft links, a lock arm pivoted on said axis closely adjacent one of said lift arms and being secured for rotation with the other of said lift arms, and a lock element radially spaced substantially from said axis for selectively coupling said one lift arm and the adjacent lock arm so as to either secure the lock arm and the adjacent lift arm for simultaneous pivoting or free the lock arm and the adjacent lift arm for limited relative pivoting.

2. In a tractor having a pair of trailing pivoted draft links, a link lifting assembly comprising, in combination, a pair of lift arms pivoted about an axis on said tractor one above each of said draft links, a pair of drop links respectively coupling said lift arms and the underlying draft links, a pair of hydraulically interconnected actuators anchored on said tractor and respectively secured to said lift arms for hydraulically raising said draft links, a lock arm pivoted on said axis closely adjacent one of said lift arms and being secured for rotation with the other of said lift arms, and a lock element fitted in alined openings formed in said one lift arm and the adjacent lock arm, said lock element being rotatably carried in one of said openings and having a non-circular portion with peaks and recesses positioned in the other of said openings, said peaks fitting closely in the surrounding opening in one angular position of the element so as to to secure the lock arm and the adjacent lift arm for simultaneous pivoting while rotation of said element from said one angular position frees the lock arm and the adjacent lift arm for limited relative pivoting.

3. The combination of claim 2 in which said element is formed with a wrench receiving head projecting from said arms for facilitating rotation of the element and including means locking said element against axial movement in said openings.

4. The combination of claim 2 including a cross shaft mounted for rotation on said axis, said other lift arm and said lock arm being non-rotatably secured to said shaft, and said one lift arm being pivoted on said shaft.

References Cited by the Examiner

UNITED STATES PATENTS 2,880,812   4/1959   Morse _____ 172—460

FOREIGN PATENTS 667,488   3/1952   Great Britain.

LEO FRIAGLIA, *Primary Examiner.*